(12) United States Patent
Strawn et al.

(10) Patent No.: US 7,573,460 B2
(45) Date of Patent: *Aug. 11, 2009

(54) PERSONALISED PHONE STRUCTURE

(75) Inventors: Andrew Strawn, Hamphsire (GB);
Nigel Richardson, Farnham (GB)

(73) Assignee: Nokia Corporation, Espoo (FI)

( * ) Notice: Subject to any disclaimer, the term of this patent is extended or adjusted under 35 U.S.C. 154(b) by 264 days.

This patent is subject to a terminal disclaimer.

(21) Appl. No.: 11/016,194

(22) Filed: Dec. 17, 2004

(65) Prior Publication Data

US 2005/0134570 A1    Jun. 23, 2005

(30) Foreign Application Priority Data

Dec. 23, 2003    (GB)    ................. 0329850.2

(51) Int. Cl.
*G09G 5/00* (2006.01)

(52) U.S. Cl. ................. 345/156; 345/170; 345/172; 345/168; 345/184

(58) Field of Classification Search ......... 345/156–184; 708/100–714; 463/37–39, 46, 248; 248/917; 312/223.1; 361/600; 400/474; 706/15; 200/334; 341/22; 348/207.1
See application file for complete search history.

(56) References Cited

U.S. PATENT DOCUMENTS

| 4,831,219 | A | * | 5/1989 | Sugiura et al. | ............... | 200/5 A |
| 6,160,540 | A | | 12/2000 | Fishkin et al. | ............... | 345/184 |
| 6,239,784 | B1 | * | 5/2001 | Holmes | ................. | 345/156 |
| 6,268,857 | B1 | * | 7/2001 | Fishkin et al. | ............... | 715/863 |
| 6,307,751 | B1 | * | 10/2001 | Bodony et al. | ............... | 361/749 |
| 6,585,162 | B2 | * | 7/2003 | Sandbach et al. | ...... | 235/462.44 |
| 6,658,208 | B2 | * | 12/2003 | Watanabe et al. | ............. | 396/89 |
| 6,924,787 | B2 | * | 8/2005 | Kramer et al. | ............... | 345/156 |
| 7,092,520 | B2 | * | 8/2006 | Fuhrmann et al. | ...... | 379/433.11 |
| 7,120,615 | B2 | * | 10/2006 | Sullivan et al. | ............... | 706/15 |
| 7,133,026 | B2 | * | 11/2006 | Horie et al. | ................. | 345/163 |
| 7,176,399 | B2 | * | 2/2007 | Graiger et al. | ............... | 200/334 |
| 7,373,863 | B2 | * | 5/2008 | O'Banion et al. | ............... | 83/63 |
| 7,379,052 | B1 | * | 5/2008 | Dellenger | .................... | 345/167 |
| 7,456,823 | B2 | * | 11/2008 | Poupyrev et al. | ............. | 345/173 |
| 2002/0021277 | A1 | * | 2/2002 | Kramer et al. | ............... | 345/156 |
| 2003/0063072 | A1 | * | 4/2003 | Brandenberg et al. | ........ | 345/173 |
| 2003/0117377 | A1 | * | 6/2003 | Horie et al. | .................. | 345/173 |
| 2003/0222800 | A1 | * | 12/2003 | Uke | ............................. | 341/22 |
| 2004/0012557 | A1 | * | 1/2004 | Daniel | ......................... | 345/156 |
| 2004/0017473 | A1 | * | 1/2004 | Marks | ....................... | 348/207.1 |
| 2004/0046739 | A1 | * | 3/2004 | Gettemy | ..................... | 345/158 |
| 2004/0186995 | A1 | * | 9/2004 | Yim et al. | .................... | 713/168 |
| 2004/0233169 | A1 | * | 11/2004 | Willat et al. | ................. | 345/163 |
| 2005/0110702 | A1 | * | 5/2005 | Aoki et al. | ..................... | 345/30 |
| 2005/0186995 | A1 | * | 8/2005 | Gill | .......................... | 455/575.1 |
| 2006/0132433 | A1 | * | 6/2006 | Kramer et al. | ............... | 345/156 |
| 2006/0139322 | A1 | * | 6/2006 | Marks | .......................... | 345/156 |
| 2008/0062145 | A1 | * | 3/2008 | Shahoian et al. | ............ | 345/173 |
| 2008/0246726 | A1 | * | 10/2008 | Gettemy | ..................... | 345/158 |

FOREIGN PATENT DOCUMENTS

GB    2345743    *  1/1999
GB    2345743 A  *  7/2000

* cited by examiner

*Primary Examiner*—Prabodh M Dharia
(74) *Attorney, Agent, or Firm*—Harrington & Smith, PC

(57) ABSTRACT

A handheld electronic device including a body, wherein said body includes at least a portion which is deformable by the application of a squeezing force by a user's hand whereby the deformable portion is moved between a first un-deformed position and a second deformed position.

27 Claims, 5 Drawing Sheets

PERSONALISED PHONE STRUCTURE

FIELD OF THE INVENTION

The present invention relates to a handheld electronic device.

BACKGROUND OF THE INVENTION

A problem with known hand held electronic devices is that they can be difficult to hold and awkward to move or control because of their size, shape and/or weight. In particular, they can be difficult to both hold and operate at the same time.

One reason for this is that their shape is often not optimised for a user's hands. One possible solution to this problem is to provide an electronic device having an outer cover which has been moulded into a shape compatible with a user's hand. However, this shape will not be optimised for all users, as different users will have hands of differing size and shape. Accordingly, a range of devices having covers of differing size and shape is required to suit differing user's needs. Alternatively, a single device having a cover which is replaceable with covers of differing size or shape may be provided.

Another reason for the above problem is that with hand held electronic devices having buttons/keys, the buttons/keys may not be in an optimal position for use when holding the device. One possible solution to this problem is to provide an electronic device having the buttons/keys in a position in which they are easily operated by a user's fingers/thumbs when holding the device. However, this will not be optimised for all users for the same reason as outlined above having regard to the shape of the device. Accordingly, a range of devices having differing arrangements of the buttons/keys is required to suit differing user's needs. Alternatively, a single device having a button/key pad portion which is replaceable with other button/key pad portions having differing arrangements of buttons/keys may be provided.

A further problem with known hand held electronic devices is that all the devices in a particular product line have identical visual characteristics.

Personalising an electronic device, and more particularly a mobile phone, to a user's requirements is highly desirable. One possible solution is to provide an active cover that has changeable colours/keymat/lighting etc. Other possible solutions include: (1) changing the cover—colours/patterns etc; (2) changing the keymat; and (3) personalising the software.

SUMMARY OF THE INVENTION

An aim of the embodiments described hereinafter is to solve the problems outlined above.

According to the present invention there is provided a handheld electronic device comprising a body, wherein said body comprises at least a portion which is deformable by the application of a squeezing force by a user's hand whereby the deformable portion is moved between a first un-deformed position and a second deformed position.

According to another aspect of the present invention there is provided a housing for a handheld electronic device wherein said housing comprises at least a portion which is deformable by the application of a squeezing force by a user's hand whereby the deformable portion is moved between a first un-deformed position and a second deformed position.

Embodiments of the present invention solve the above-identified problems by providing a hand held electronic device, and more particularly a mobile phone, which can be modified by a user in order to suit the needs of a user. The device can be moulded, and remoulded, into one or more desired shapes by a user to enhance the grip and usability of the device. Furthermore, the buttons/keys can be positioned, and repositioned, by a user to enhance usability.

According to an embodiment of the present invention it is possible to "mould" or "form" the cover of a phone to a user's individual requirements to get the perfect grip for different applications, i.e. phoning/videoing/gaming etc. Embodiments of the invention also show how the keys/buttons can be formed around an individual shape to improve the grip and usability further.

The modifications can not only improve usability for such a product but also personalise the product by distinguishing the product aesthetically over other such devices. The personalised nature of such a device improves the fashionability of the device and will also prevent users from confusing their device with another of the same type. That is, embodiments of the present invention takes the personalisation a step further by allowing the covers to have a degree of mouldability to fit the individual user and have flexibility within the keys/buttons to position them to the user's requirements.

One concept suggests the use of mouldable mechanics using shape memory polymers which require heat to deform the plastic material. However, this idea requires a cover to be heated before a shape will alter and will remain in this shape when cooled. This allows the user to change the cover only with the aid of heating, and only once. However, embodiments of the present invention do not require heat in order to shape a product, but rather provide mouldable mechanics which may be deformed according to a user's wishes by altering the keypad and/or altering the grip/shape of the video functions using hand pressure alone and independently of the influence of heat. Embodiments of the present invention thus allow user personalisation and also provide a convenient and comfortable grip to users of handsets incorporating video functionality. Allowing personalisation of key positions is also highly desirable and advantageous in a gaming product.

BRIEF DESCRIPTION OF THE DRAWINGS

For a better understanding of the present invention and to show how the same may be carried into effect reference will now be made by way of example to the accompanying drawings in which:

FIG. 6(*a*) shows the front side of an embodiment of a mobile gaming device according to the present invention;

FIG. 6(*b*) shows a perspective view of the mobile gaming device shown in FIG. 6(*a*) with the front buttons omitted for clarity;

FIG. 7(*a*) shows how buttons on the embodiment shown in FIG. 1(*a*) can be repositioned to accommodate different hand sizes;

FIG. 7(*b*) shows how buttons on the embodiment shown in FIG. 1(*b*) can be repositioned to accommodate different hand sizes;

FIG. 8(*a*) is a schematic diagram of a conductive key/button disc; and

DETAILED DESCRIPTION OF THE EMBODIMENTS OF THE INVENTION

A first embodiment of an electronic device according to the present invention will now be described with reference to FIGS. 1 to 3. The first embodiment is a mobile phone handset.

Figure 1A:
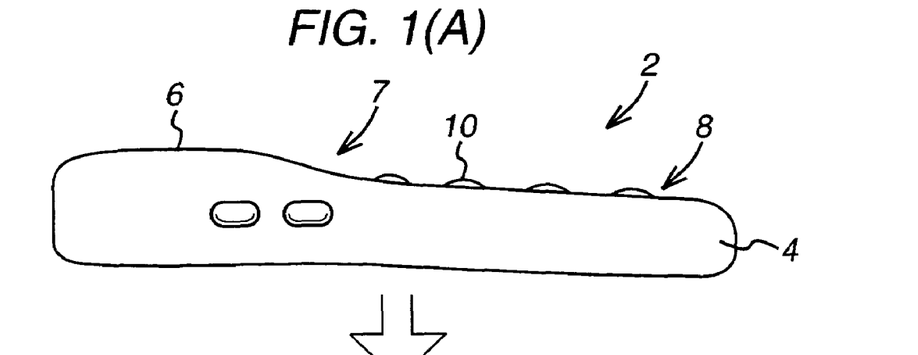
FIG. 1 is a side view of a mobile phone in an undeformed state and in deformed state.
Figure 1B:
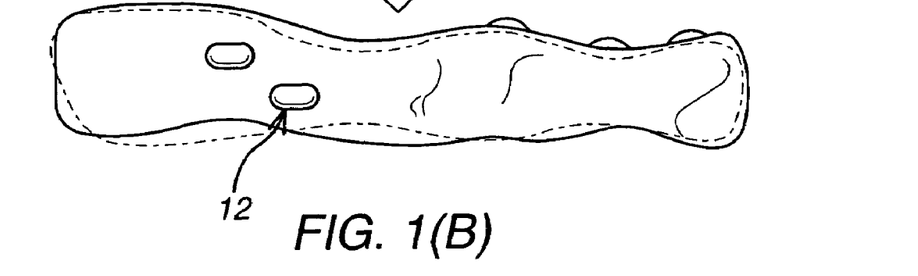

FIG. 1 shows a mobile phone handset 2 comprising a body 4, a display 6 on a front side 7 of the body 4, a keypad 8 comprising keys 10 on the front side 7 of the body 4, and side buttons 12 on a side surface 13 of the body 4, the side surface 13 extending in a substantially perpendicular direction from the front side. The body includes an engine and a housing. The body 4 comprises a mouldable material. In one arrangement the mouldable material is selected so that after moulding the material will remain in the moulded form until a squeezing force is applied to remould the material into a different shape. In an alternative arrangement, the mouldable material can be a foam based material that is mouldable, and when released has a slow memory return to its initial shape. The mouldable material may be selected based on the material mouldability and the spring-back time to the initial position.

The material properties should allow the product to be moulded by a user to the desired shape and when the user has finished with the shape (e.g. changes application) the material should slowly revert to it's memorised position. Preferably, the time for reverting to it's memorised shape is approximately 20 to 30 minutes.

The material should ideally have the following characteristics:

1. Excellent resistance to compression set (i.e. the material will always return to the memorised state);
2. High energy absorption;
3. Temperature range to be approximately −40° C. to +90° C.;
4. Bondable surface so the material can be moulded/adhered to phone covers;
5. Dimensional stability;
6. Flame retardant;
7. High wear resistance for external use.

Accordingly, the material may be a foam-based product that is mouldable and has a slow memory to initial position. Possibilities are:

1. Urethane Foams (Poron);
2. Neoprene sponge;
3. PVC;
4. Silicon.

FIG. 1 shows the mobile phone handset 2 in a first "memorised" position (A) in which the handset is not deformed, and in a second "formed" or "moulded" state (B) in which a user has formed the material of the body 4 into a preferred configuration for use. Accordingly, FIG. 1 illustrates that the form of the mobile phone is changeable by a user. In the deformed state, the side buttons 12 are repositioned. The keys of the key pad on the front surface of the body are repositioned. In each case the keys are repositioned with respect to each other and with respect to other external parts of the phone, such as other keys, the display and the surfaces of the body. The surfaces of the body, in particular the side surfaces at right angles to the front surface, are moulded to a shape complementary to the user's fingers and thumb e.g. in the figure a thumb position is shown indented.

Accordingly, a product is provided having a body made of material with properties that have a degree of mouldability/formability to improve the shape/grip and usability of the product. Alternatively, a changeable/replaceable cover or housing may be provided for fitting to a product, the changeable cover or housing being made of material with properties that have a degree of mouldability/formability to improve the shape/grip and usability of the product.

The user achieves the desired shape by compressing/squeezing the material of the body/cover. Depending on the material used, the body/cover may go back to it's original "memorised" shape over a period of time after the user has finished using the product and has released his/her grip. The keymat/keypad 8 also has a degree of flexibility within the body/changeable cover.

The formability if the device may come solely from the cover. In such an embodiment a formable cover, which could be replaceable (as described above), houses the internal components of the device, which are rigidly interconnected, for instance by mounting on a common circuit board and/or by being located on a rigid internal housing. In an alternative embodiment the internal components could be flexibly interconnected and could move with respect to each other when the user forms the device.

Figure 2A:
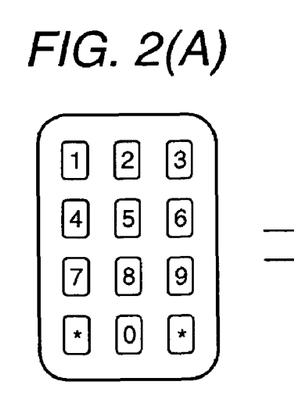
FIG. 2 is a front view of a keypad in which the buttons/keys are repositionable.
Figure 2B:
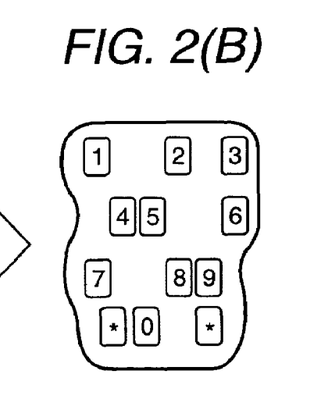
Figure 2C:
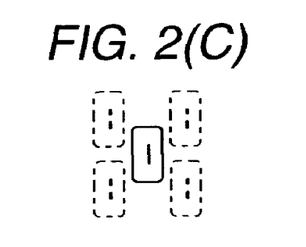

FIG. 2 shows a keypad having repositionable buttons/keys. FIG. 2 shows the keypad in a first standard or undeformed position (A), and in a second deformed state (B) in which a user has formed the material of the keypad into a preferred configuration for use. Thus, the shape of the keypad can be deformed by a user, and the keys can move according to the deformation of the keypad. Alternatively, or additionally, the keys can be moved individually and separately from the deformation of the body of the device. FIG. 2(C) shows a moveable key. The figure illustrates the key in its central, undeformed position, and positions to which the key can be moved i.e. maximum key positions. The key may be attached to the main printed wiring board by flexi so as to allow this movement.

Another device having video function will now be described with reference to FIGS. 3 to 5.

The device 20 comprises a body 22, a display 24, and buttons 26, including zoom buttons, on the body. The body may be moulded to fit a user's hand by the application of a squeezing force so as to form thumb and finger positions. For certain selected materials, the material springs back to its original position after a short period of time as shown in FIG. 4. In the illustrated arrangement the body comprises a memorised mouldable grip 28 and also non-mouldable portions 30. The body also comprises a memorised mouldable area 29 around the buttons. The user may want to move the "zooming in/out" button to fit the position of the user's thumb/finger when the cover is squeezed to the desired shape. In this case, moveable buttons are provided similar to those illustrated in FIG. 2. The display may be hingeably mounted on the body whereby the display can be moved from a first position into a second position for use. These features may be incorporated into a mobile phone hand-set. Alternatively, the device may be a hand held video recorder, a hand held television, or some other hand held electronic device.

Figure 3:
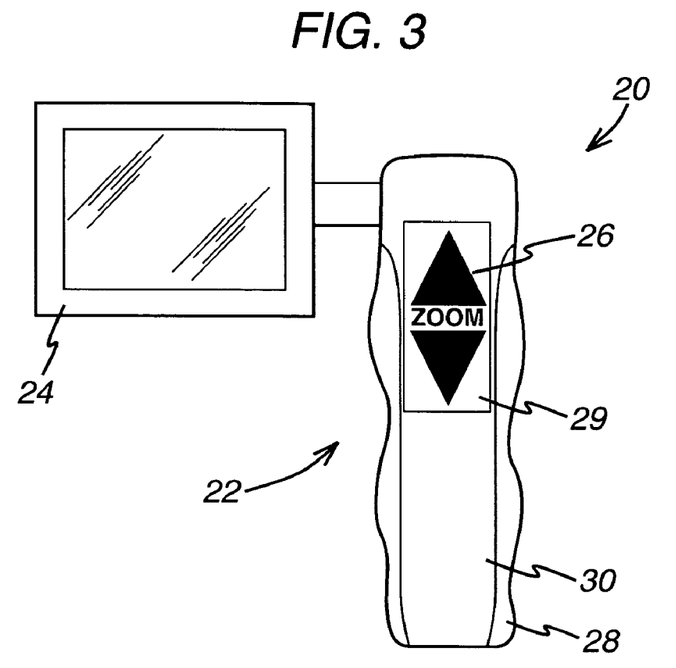
FIG. 3 shows a device having video function and including a mouldable body.
Figure 4:
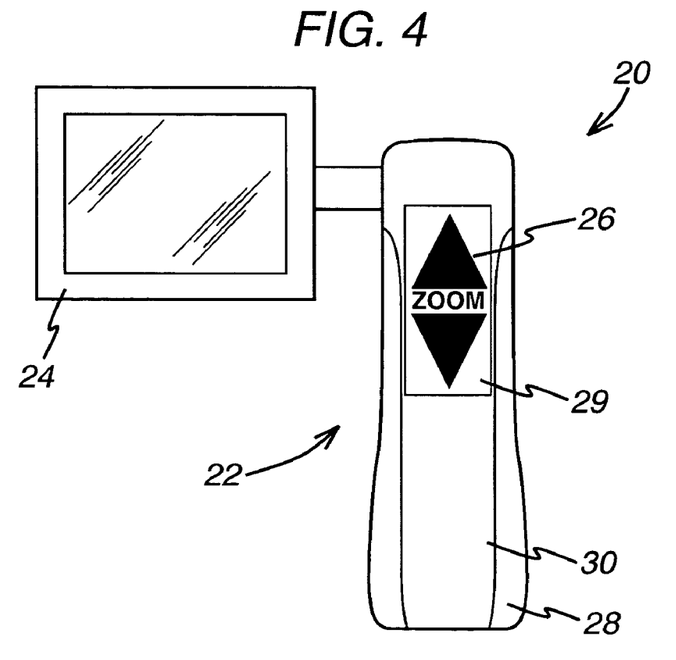
FIG. 4 shows the device of FIG. 3 in which the mouldable body has returned to its original position.
Figure 5:
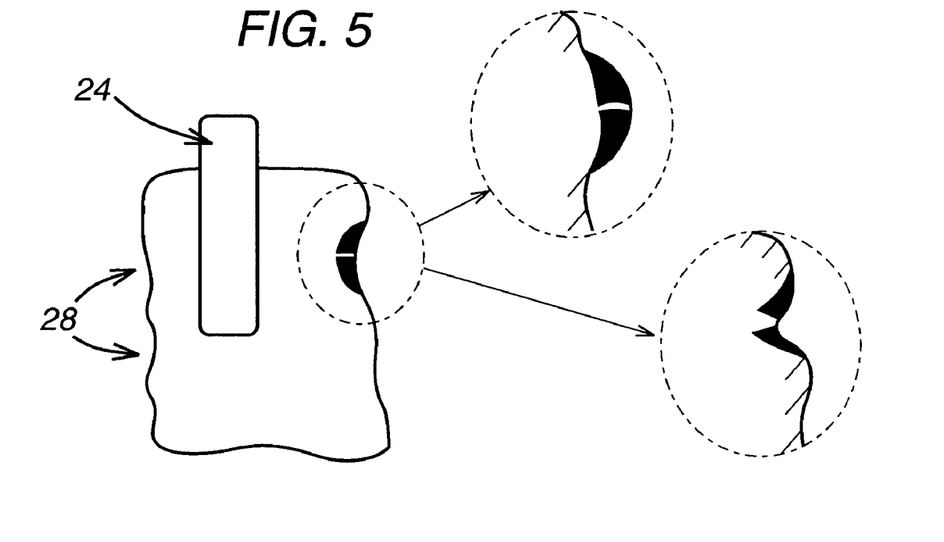
FIG. 5 shows a side view of the device of FIGS. 3 and 4 having flexible volume keys.

FIG. 5 shows a side view of the device shown in FIGS. 3 and 4. The device has volume keys on a mouldable side of the body. The volume keys have the flexibility to be repositioned. That is, the volume buttons have a degree of movability whereby when a user deforms the body, the volume keys can move to accommodate a change in shape of the body.

Another device comprising a mobile gaming device will now be described with reference to FIGS. 6 and 7.

Figure 6A:
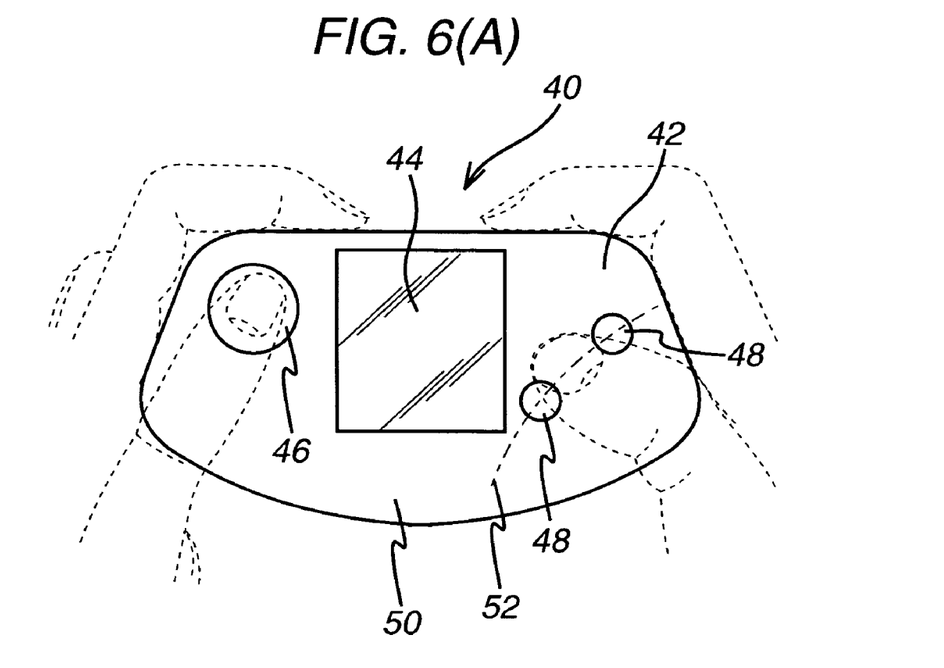

FIG. 6(a) shows a mobile gaming device 40 comprising a body 42, a display 44, a navigation button 46 and two "fire" buttons 48. The display, the navigation button and the "fire"

buttons are disposed on a front face 50 of the body of the mobile gaming device. An arc 52 indicates the path of a user's thumb movement over the gaming buttons 48.

Figure 6B:
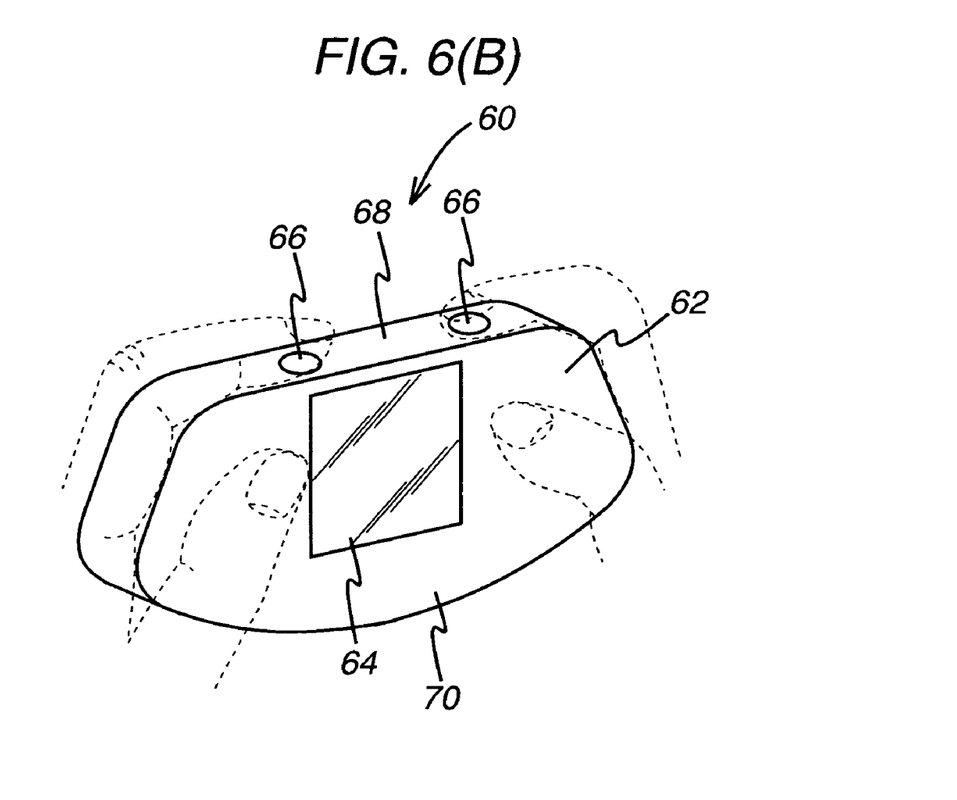

FIG. 6(*b*) shows the top edge of the mobile gaming device shown in FIG. 6(*a*). The gaming device 60 comprises a body 62, a display 64, and two gaming buttons 66. The gaming buttons 66 are disposed on a top surface 68 of the body of the device, with the display disposed on a front surface 70 of the device, the top surface and the front surface being at substantially at right angles to each other. The other buttons shown in FIG. 6(*a*) are omitted for clarity.

In another embodiment (not illustrated), a gaming device may be provided which has buttons on one or more of any of the surfaces of the body of the device. The display may be separate from the handset rather than located on the handset.

Figure 7A:
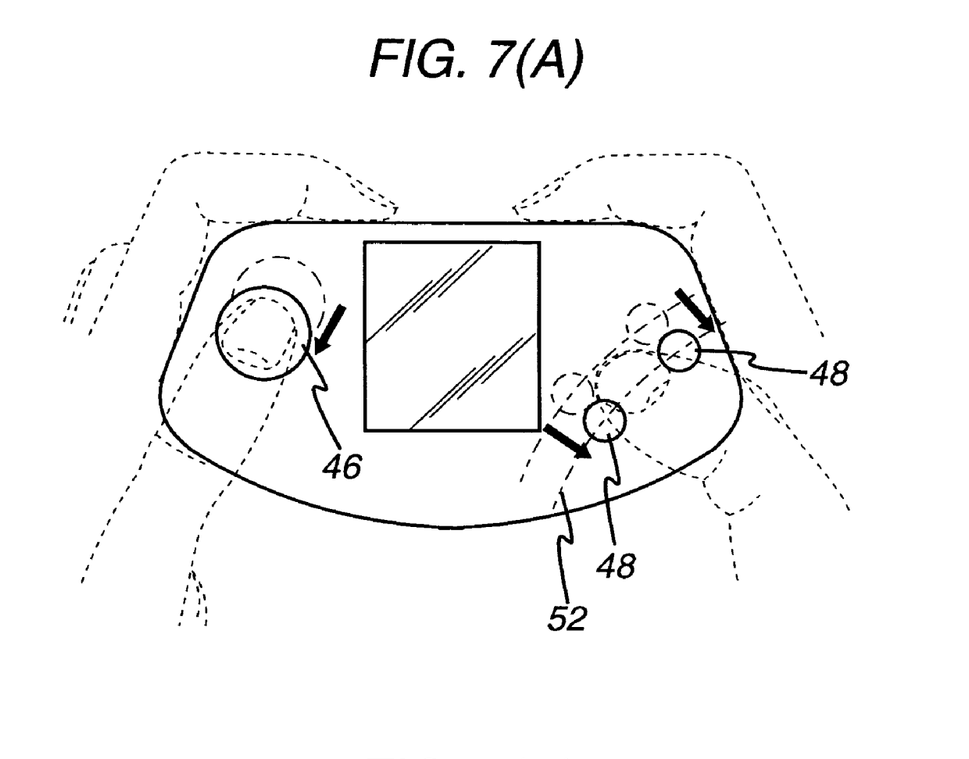

FIG. 7(*a*) illustrates how the buttons of the gaming device shown in FIG. 6(*a*) can be repositioned to accommodate a user with smaller hands. The radius of thumb movement is smaller for someone with smaller hands. Accordingly, the buttons need to be moved nearer to an edge of the device so as to accommodate this.

Figure 7B:
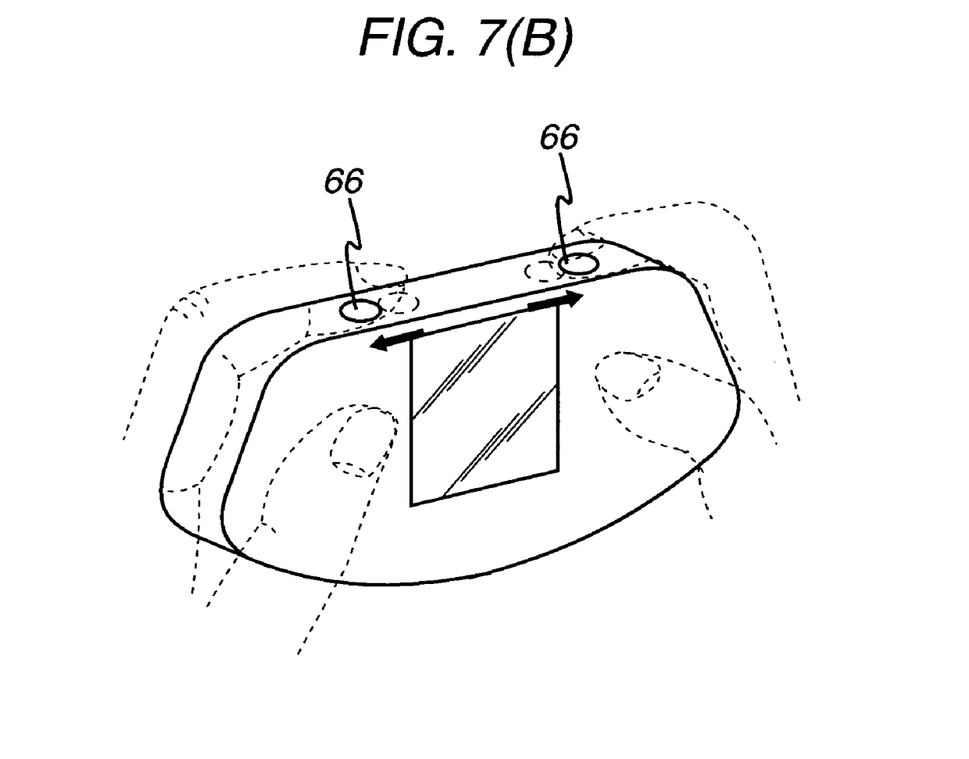

FIG. 7(*b*) shows how the buttons of the gaming device shown in FIG. 6(*b*) can be repositioned to accommodate a user with smaller hands. In this embodiment the buttons are to be operated by a user's fingers, and the buttons need to be moved nearer to an edge of the device so as to accommodate a user having shorter fingers.

Figure 8A:
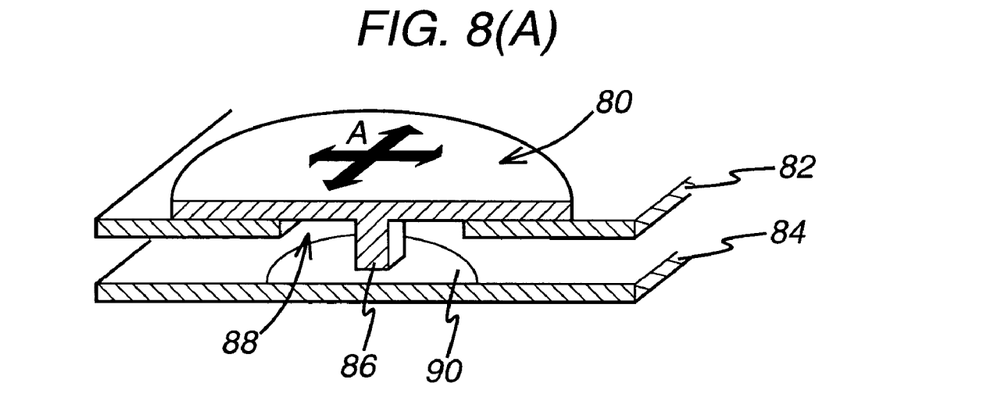

FIG. 8(*a*) illustrates a method of implementing a personalised key mat structure comprising a conductive key/button disk. The arrangement comprises a key/button disk 80, an upper printed wiring board/flexi (PWB/flexi) 82 and a lower PWB/flexi 84. The key/button disk 80 has a pivotal pin 86 which extends from a lower surface of the key/button disk 80 through a hole 88 in the upper PWB/flexi towards a contact surface 90 on the lower PWB/flexi.

The key/button disk is able to move on the upper PWB/flexi as indicated by the arrows A and in any direction in between. Movement is limited by the size/shape of the hole in the upper PWB/flexi. Movement is inhibited at a maximum displacement of the disk by the central pin on the key/button disc contacting an edge of the hole.

An electrical contact is made between the upper PWB/flexi and the lower PWB/flexi by pressing down on the key/button disc so that the central pin on the key/button disc contacts with the contact surface on the lower PWB/flexi. Wireless connection is also a possibility.

An alternative implementation of the above-described embodiment may be provided by replacing the contact surface with a large key dome. In this implementation there would be no electrical connection between the upper PWB/flexi and the lower PWB/flexi. Rather, the key/button disc would activate the key dome via mechanical means using the central pin.

Figure 8B:
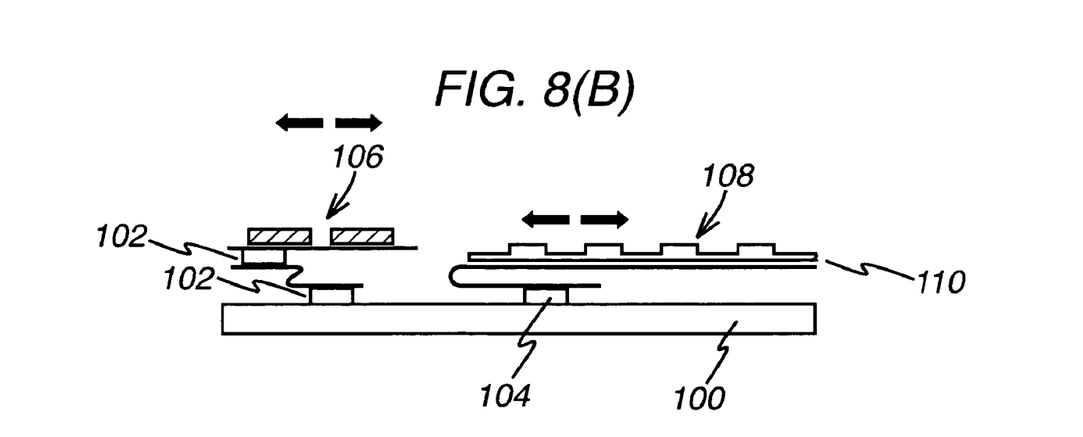
FIG. 8(b) is a schematic diagram showing a flexible printed wiring board.

FIG. 8(*b*) shows a schematic diagram of a device with the cover removed. A flexible PWB arrangement is provided comprising a rigid PWB 100, connectors 102, 104, volume keys 106, a key mat 108 and a flexi 110. The key mat 108 is made of rubber for flexibility, and is mounted on the flexi 110 which is connected to the rigid PWB 100 via the connector 104. The volume keys 106 are connected to the rigid PWB 100 via the connectors 102.

Each key can have several fixed positions available, or alternatively each key may have a continuously variable position utilising the arrangement illustrated in FIG. 8(*a*). The arrangement in which the keymat is a thin flexible rubber mat that is connected to the main printed wiring board (PWB) using a flexi, and separate keys are attached by a flexi, gives a degree of flexibility/movement. This allows separate keys to be moved to the user's requirements.

The display may comprise a liquid crystal display, a thin film transistor display, or another type of display.

Embodiments of the present invention incorporate user mouldable mechanics on the rear of a handset or on a grip (this could be a slide or rotatable grip on the side of the handset) which can be compressed/deformed by the application of a squeezing force and which maintains the deformed position while the user has a grip. On release of the squeezing force the mouldable mechanics may then slowly return to the original shape. This allows the user a more comfortable grip, for example, while using the video functions of the handset.

Embodiments of the present invention incorporate a user defined keypad using a mouldable front cover. The keypad may be made up of either a standard 4×3 pad or another pad comprising one or more keys. The keypad can be incorporated as part of a cover. Each key can be movable about a defined origin by up to 2 mm, and more preferably by up to 5 mm, and more preferably still up to 1 cm. This allows the user to define where the keys are located on the cover. Movement of the keys is made possible by the use of a mouldable front cover which allows movement of the keys and which does not return them to the original position unless actuated by a user. Connection from the keys to the printed wiring board is made by means of a flexible printed wiring board which allows enough movement for the user to move the keys. This allows personalisation of the front cover and may also be used for keys on the side of a product.

A user may mould/form the product and reposition the buttons/keys on the product for the following reasons:
1. to form the product for gaming and then reform the product for videoing;
2. to increase the gripping area to reduce the frequency that the product is dropped i.e. while video taking or gaming;
3. to gain a comfortable grip whilst using the application;
4. to allow the user to use the product for longer as it is formed to the user requirements i.e. gaming, videoing;
5. to allow the positioning of the keys/buttons to fit the user's requirements;
6. to make the same product look different;
7. to increase the fit of the product into the user's hand—small or large;
8. to enhance the "look" and "style" of the product; and
9. to provide a design "statement" or unique selling point.

To date there appear to be no products on the market that overcome the problems solved by the present invention.

The embodiments illustrated herein include a mobile phone, a mobile gaming device and a hand-held video recorder. However, the present invention may be incorporated in other hand-held electronic devices such as electronic note pads, electronic books, PDA's, calculators, personal stereos, dictaphones, etc . . .

Some devices in which the present invention may be incorporated have push buttons, while others, such as PDA's, may have a touch screen. Others still may have slide buttons or no buttons at all.

While this invention has been particularly shown and described with reference to preferred embodiments and described with references to preferred embodiments thereof, it will be understood by those skilled in the art that various changes in form and details may be made therein without departing from the scope of the invention as defined by the appended claims

The invention claimed is:

1. A handheld electronic device comprising:
a body and
at least two buttons disposed on an outer surface of said body,
wherein said body comprises at least a deformable portion which is configured to be deformed by the application of a squeezing force by a user's hand whereby the deformable portion is moved between a first un-deformed position and a second deformed position to mould the body to the user's hand thereby improving the user's grip when operating the at least two buttons when holding the device in the user's hand,
where the at least two buttons are flexibly interconnected and configured to move relative to each other.

2. The handheld electronic device according to claim 1, wherein said body comprises a further portion which is un-deformable.

3. The handheld electronic device according to claim 1, wherein said electronic device further comprises a display.

4. The handheld electronic device according to claim 1, wherein the electronic device is at least one of a mobile gaming device, a mobile phone, a hand-held video recorder, an electronic note pad, an electronic book, a PDA, a calculator, a personal stereo and a dictaphone.

5. The handheld electronic device according to claim 1, wherein said deformable portion is made of a memory material, further configured, after removing the squeezing force the body, to move from the second deformed position back to the first un-deformed position.

6. The handheld electronic device according to claim 1, wherein said deformable portion is made of a polymer foam material.

7. The handheld electronic device according to claim 1, wherein the at least two buttons are flexible and configured to flex to accommodate the movement of the deformable portion between the first un-deformed position and the second deformed position.

8. The handheld electronic device according to claim 1, wherein the at least two buttons are push buttons which are configured to move in the plane of the surface whereby the position of the at least two push buttons on the body of the device can be changed.

9. The handheld electronic device according to claim 1, wherein said electronic device further comprises a flexible keymat which is deformable by the application of a squeezing force by a user's hand whereby the keymat is moved between a first un-deformed position and a second deformed position.

10. A handheld electronic device comprising:
a body;
at least one button disposed on an outer surface of said body,
wherein said body comprises at least one portion configured to be deformed by the application of a squeezing force by a user's hand whereby the deformable portion is moved between a first un-deformed position and a second deformed position to mould the body to a user's hand thereby improving the user's grip when operating the at least one button when holding the apparatus in the user's hand; and
a flexible keymat configured to deform by the application of a squeezing force by a user's hand whereby the keymat is moved between a first un-deformed keymat position and a second deformed keymat position,
wherein the keymat comprises a first member having a hole therein for each of the at least one button, each of the at least one button comprising a disc portion and a pin portion, the pin portion extending from the disc portion though the hole whereby the disc is moveable on the keymat with the movement being limited by the size and shape of the hole, said movement being inhibited at a maximum displacement of the disc by the pin portion of the disc contacting an edge of the hole.

11. The handheld electronic device according to claim 10, wherein the keymat further comprises a second member which is contacted by the pin portion of a button when the, button is pressed by a user.

12. The handheld electronic device according to claim 11, wherein the first and second members are printed circuit boards and an electrical connection is made between said printed circuit boards when the button is pressed.

13. The handheld electronic device according to claim 11, wherein the second member is a keydome and the keydome is activated by the pin portion when the button is pressed.

14. A handheld electronic device comprising a body and at least two buttons disposed on an outer surface of said body, wherein said body comprises at least a deformable portion configured to be deformed by the application of a force by a user's hand whereby the deformable portion is moved between a first un-deformed position and a second deformed position, wherein the second deformed position provides a user-preferred configuration for use of the at least two buttons,
where the at least two buttons are flexibly interconnected and configured to move relative to each other.

15. The handheld electronic device according to claim 14, wherein said body comprises a further portion which is un-deformable.

16. The handheld electronic device according to claim 14, wherein said electronic device further comprises, a display.

17. The handheld electronic device according to claim 14, wherein the electronic device is at least one of a mobile gaming device, a mobile phone, a hand-held video recorder, an electronic note pad, an electronic book, a PDA, a calculator, a personal stereo and a dictaphone.

18. The handheld electronic device according to claim 14, wherein said deformable portion is made of a memory material, whereby after removing the force the body moves from the second deformed position back to the first un-deformed position.

19. The handheld electronic device according to claim 14, wherein said deformable portion is made of a polymer foam material.

20. The handheld electronic device according to claim 14, wherein the at least two buttons are disposed on an outer surface of said deformable portion of said body.

21. The handheld electronic device according to claim 20, wherein the at least two buttons are configured to flex to accommodate the movement of the deformable portion between the first un-deformed position and the second deformed position.

22. The handheld electronic device according to claim 20, wherein the at least two buttons are push buttons which are configured to move in the plane of the surface of the deformable portion whereby the position of the at least two push buttons on the body of the device can be changed.

23. The handheld electronic device according to claim 20, wherein said electronic device further comprises a flexible keymat which is deformable by the application of a force by a user's hand whereby the keymat is moved between a first un-deformed position and a second deformed position.

24. The handheld electronic device according to claim 23, wherein the keymat comprises a first member having a hole therein for each button, each button comprising a disc portion and a pin portion, the pin portion extending from the disc portion though the hole whereby the disc is moveable on the keymat with the movement being limited by the size and shape of the hole, said movement being inhibited at a maximum displacement of the disc by the pin portion of the disc contacting an edge of the hole.

25. The handheld electronic device according to claim 24, wherein the keymat further comprises a second member which is contacted by the pin portion of a button when the button is pressed by a user.

26. The handheld electronic device according to claim 25, wherein the first and second members are printed circuit boards and an electrical connection is made between said printed circuit boards when the button is pressed.

27. The handheld electronic device according to claim 25, wherein the second member is a keydome and the keydome is activated by the pin portion when the button is pressed.

* * * * *